US012503353B2

(12) United States Patent
Yanes

(10) Patent No.: US 12,503,353 B2
(45) Date of Patent: Dec. 23, 2025

(54) O-RING RETAINING APPARATUS FOR A BAR GUN

(71) Applicant: TAPRITE MICRO MATIC, INC., San Antonio, TX (US)

(72) Inventor: Gilbert Yanes, Boerne, TX (US)

(73) Assignee: TAPRITE MICRO MATIC, INC., San Antonio, TX (US)

( * ) Notice: Subject to any disclaimer, the term of this patent is extended or adjusted under 35 U.S.C. 154(b) by 74 days.

(21) Appl. No.: 18/339,897

(22) Filed: Jun. 22, 2023

(65) Prior Publication Data

US 2023/0331533 A1 Oct. 19, 2023

Related U.S. Application Data

(63) Continuation-in-part of application No. 17/807,477, filed on Jun. 17, 2022, now Pat. No. 11,724,929, which is a continuation of application No. 17/099,580, filed on Nov. 16, 2020, now Pat. No. 11,390,512.

(60) Provisional application No. 62/936,194, filed on Nov. 15, 2019.

(51) Int. Cl.
*B67D 1/00* (2006.01)

(52) U.S. Cl.
CPC .... *B67D 1/0084* (2013.01); *B67D 2001/0093* (2013.01)

(58) Field of Classification Search
CPC ...................... B67D 1/0084; B67D 2001/0093
See application file for complete search history.

(56) References Cited

U.S. PATENT DOCUMENTS 3,168,967 A 2/1965 Giampa
3,703,187 A 11/1972 Booth
4,986,449 A * 1/1991 Valiyee ................ B67D 1/0084 222/144.5
5,042,692 A * 8/1991 Valiyee ................ B67D 1/0084 285/305
8,272,536 B2 9/2012 Valiyee et al.
8,387,829 B2 3/2013 Schroeder et al.
8,418,888 B2 4/2013 Schroeder et al.
8,459,505 B2 6/2013 Martindale et al.
8,770,442 B2 7/2014 Santy et al.
11,643,318 B2 5/2023 Martin et al.
2009/0084817 A1 * 4/2009 Schroeder ............ B67D 1/0084 222/144.5
2009/0230148 A1 * 9/2009 Valiyee ................ B67D 1/0084 222/144.5
2011/0073617 A1 * 3/2011 Martindale .......... B67D 1/0086 222/144.5
2016/0029686 A1 2/2016 Hecht et al.
(Continued)

OTHER PUBLICATIONS

Extended European Search Report dated Nov. 7, 2023 issued in related European App. No. 20887457.8 (9 pages).
(Continued)

*Primary Examiner* — Jeremy Carroll
(74) *Attorney, Agent, or Firm* — Haynes and Boone, LLP; William B. Nash; Jason Whitney

(57) ABSTRACT

A system and method of using an O-ring retaining apparatus to maintain an O-ring in the same position relative to the position of the handle of a bar gun while permitting a valve stem in physical contact with the O-ring to slide past without the O-ring becoming dislodged.

13 Claims, 13 Drawing Sheets

(56) References Cited

U.S. PATENT DOCUMENTS

| | | | | |
|---|---|---|---|---|
| 2021/0147208 | A1* | 5/2021 | Yanes | B67D 1/0084 |
| 2023/0331533 | A1* | 10/2023 | Yanes | B67D 1/0084 |

OTHER PUBLICATIONS

International Search Report and Written Opinion dated Sep. 3, 2024 issued in co-pending PCT App. No. PCT/US2024/035252 (9 pages).
Wunder-Bar Mark 4 Post-Mix Beverage Dispenser Manual, printed from the internet https://www.wunderbar.com/assets/upload/documentation/M4_English_Manual_2000_504.pdf.
International Search Report and Written Opinion dated Feb. 5, 2021 issued in PCT App. No. PCT/US2020/060787 (16 pages).

* cited by examiner

O-RING RETAINING APPARATUS FOR A BAR GUN

CROSS-REFERENCE TO RELATED APPLICATIONS

This application is a continuation-in-part of U.S. Ser. No. 17/807,477, filed on Jun. 17, 2022, and entitled “0-Ring Retaining Apparatus For a Bar Gun,” which is a continuation of U.S. Ser. No. 17/099,580, filed on Nov. 16, 2020, issued as U.S. Pat. No. 11,390,512 and entitled “0-Ring Retaining Apparatus For a Bar Gun,” which claims the benefit of U.S. Provisional Application No. 62/936,194, filed Nov. 15, 2019, which is incorporated by reference herein in its entirety.

TECHNICAL FIELD

This specification relates to the field of beverage dispensing apparatus. More specifically, this application is directed toward systems and methods of an O-ring retaining apparatus for use in a bar gun.

BACKGROUND

Various systems exist to dispense beverages in retail establishments, bars, or restaurants. Included among these are what are termed in the industry various bar-gun apparatus. These systems dispense a beverage by transporting it from a storage location where it may be under pressure, to a flow control manifold rigidly attached to a bar or countertop, into a flexible tubing system to a dispenser apparatus or assembly, which may be called a bar gun. A user may actuate a control, for example a depressible button, on the bar gun to dispense one or more beverages or fluids into a container for consumption. Such bar guns include O-rings to limit leakage of the various fluids out of the bar gun.

Bar-gun apparatus are well-known in the art. U.S. Pat. No. 8,770,442 to Santy et. al shows an exemplary apparatus and method with approaches for the design of a valve stem to retain an O-ring in a bar gun for dispensing, which is incorporated by reference.

U.S. Pat. No. 8,418,888 to Schroeder et. al, shows an exemplary bar gun apparatus with approaches for the design of a backing plate that guides a valve stem for a valve in a bar gun, which is incorporated by.

U.S. Pat. No. 8,387,829 to Schroeder et. al, shows an exemplary bar gun apparatus with approaches for the design of a nozzle assembly to be attached to the end of a bar gun, which is incorporated by reference.

SUMMARY OF THE PRESENT DISCLOSURE

The present disclosure describes improved systems and methods directed toward the use of an O-ring retaining apparatus for use in a beverage dispensing apparatus such as a bar gun. The novel systems and methods in this disclosure enable a user of a bar gun to increase reliability of the O-ring seals in a bar gun, reducing leakage, reducing maintenance, and increasing service life of the bar gun.

DETAILED DESCRIPTION

Various embodiments of improved systems and methods of using an O-ring retaining apparatus in a beverage dispensing apparatus such as a bar gun will now be described with more particular reference to the attached figures. Hereafter, details are set forth by way of example to facilitate discussion of the disclosed subject matter. It should be apparent to a person of ordinary skill in the art, however, that the disclosed embodiments are exemplary and not exhaustive of all possible embodiments.

A first embodiment of a system and method of using an O-ring retaining apparatus in a bar gun is shown in FIGS. 1-4. The apparatus comprises at least one plate rigidly fixed to the body of the bar gun handle to hold the O-rings in place when the bar gun is in operation and contains fluids under pressure. Persons of ordinary skill will recognize that the disclosed embodiment is exemplary only, and that the plate may be made of various metals, may be of different shapes, or that there may be a plurality of plates to retain the O-rings in place, or the means to hold the plate rigidly fixed to the body may vary.

Figure 1:
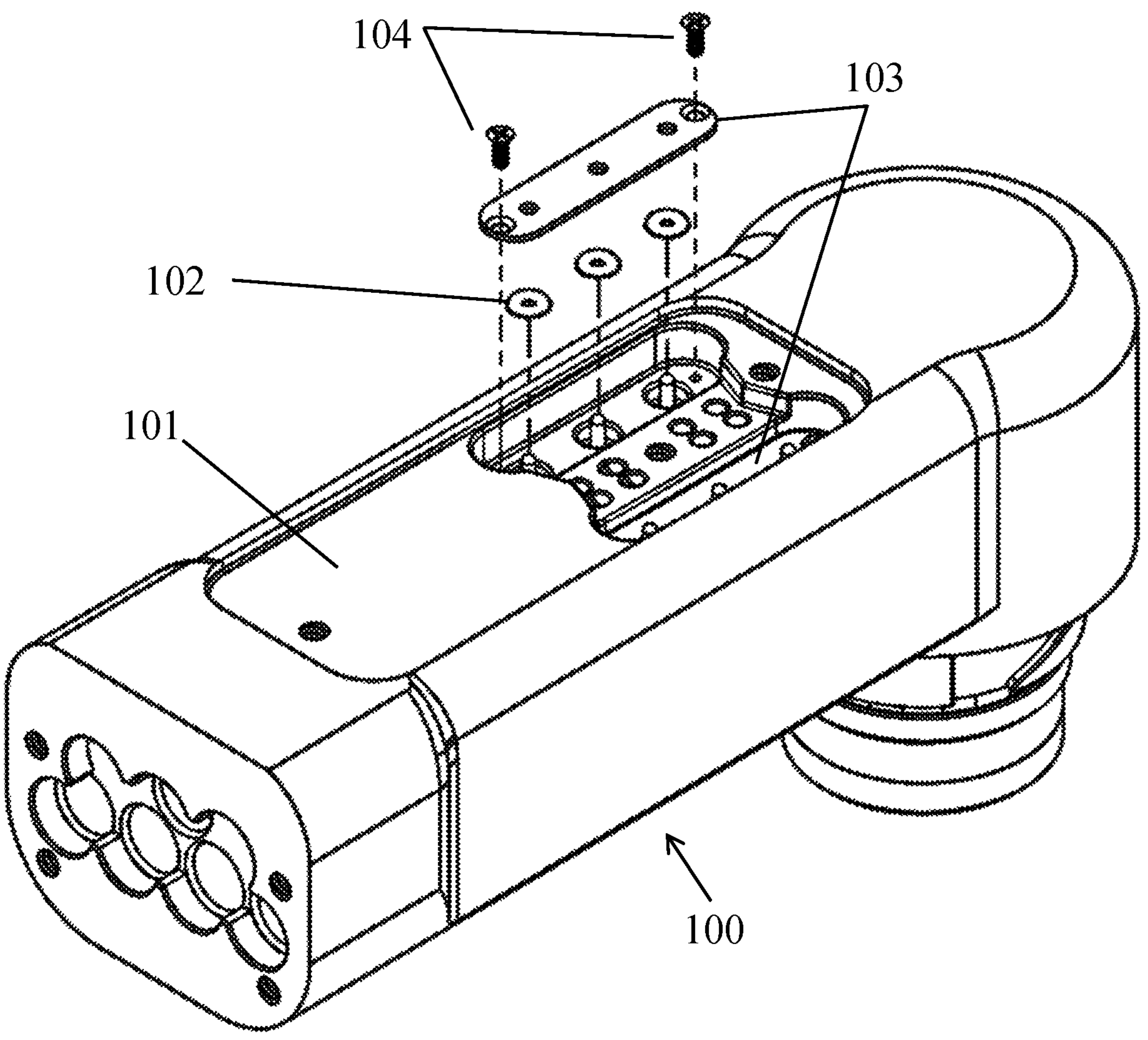
FIG. 1 is a partial exploded perspective view of a bar gun handle in accordance with a first embodiment of the present disclosure.

FIG. 1 shows a partial exploded perspective view of a bar gun handle 100, which is a six-valve bar gun configured for a five-button control panel (not shown). The handle 100 is configured to accept six O-rings 102 with corresponding valve stems that proceed through holes in two retaining plates 103 as shown. The O-ring retaining plates 103 may be constructed of any suitable material, such as metal, plastic, food-grade plastic, or other material. The retaining plates 103 are rigidly attached to the body 101 of the bar gun handle 100 by screws 104. In FIG. 1, retaining plates 103 are shown to be installed in a corresponding indentation in the exterior of body 101, but such configuration is not required. For example, there may be no indentation in body 101, or the indentation may be of different dimensions than of the retaining plates 103.

Figure 2:
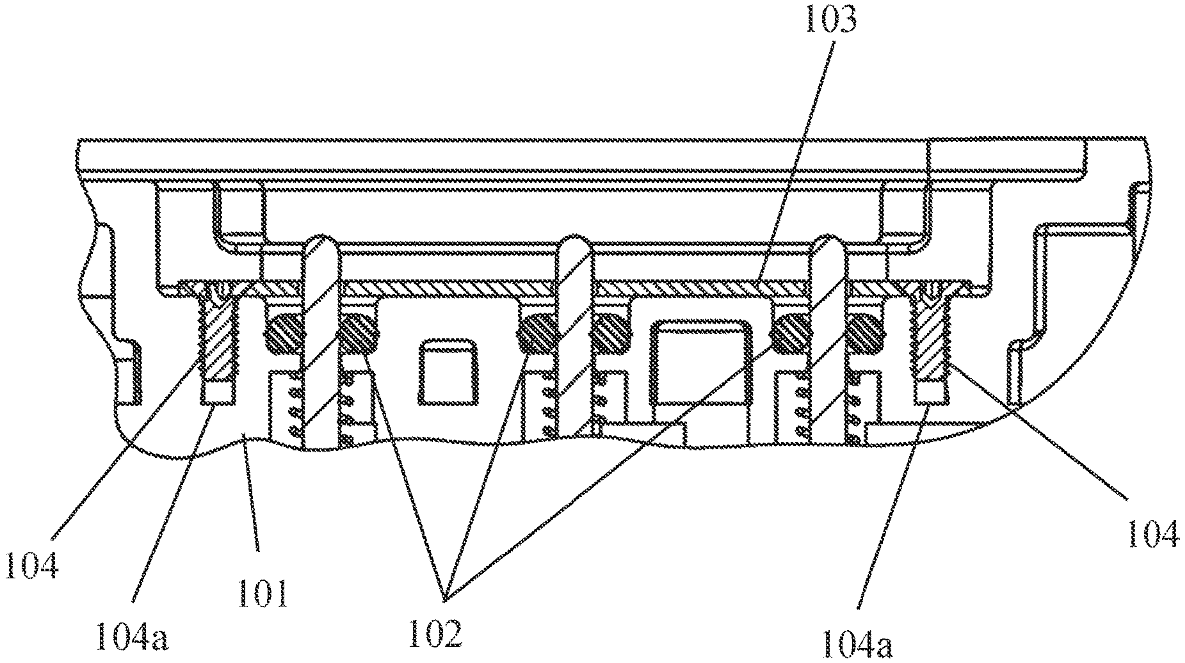
FIG. 2 is a partial cross-sectional view of a bar gun handle in accordance with a first embodiment of the present disclosure.

FIG. 2 is a partial cross-sectional view of the bar gun handle 100 of FIG. 1, showing the vertical plane passing through the valve stems (again, the bar gun's control panel is not shown). As illustrated by FIG. 2, in this embodiment, the installed retaining plate 103 sits on the surface of body 101 and is rigidly attached by screws 104 received in threaded holes or openings 104*a* in the body 101. A user may actuate a button on the control panel to open a valve, which in turns moves one or more valve stems up and down to dispense the desired liquid from the bar gun nozzle. When a user depresses or releases the buttons, O-rings 102 are held in place in their respective indentations in body 101 by retaining plate 103 as the valve stems move up and down shown in FIG. 2. Thus, the O-rings are retained in place.

Figure 3:
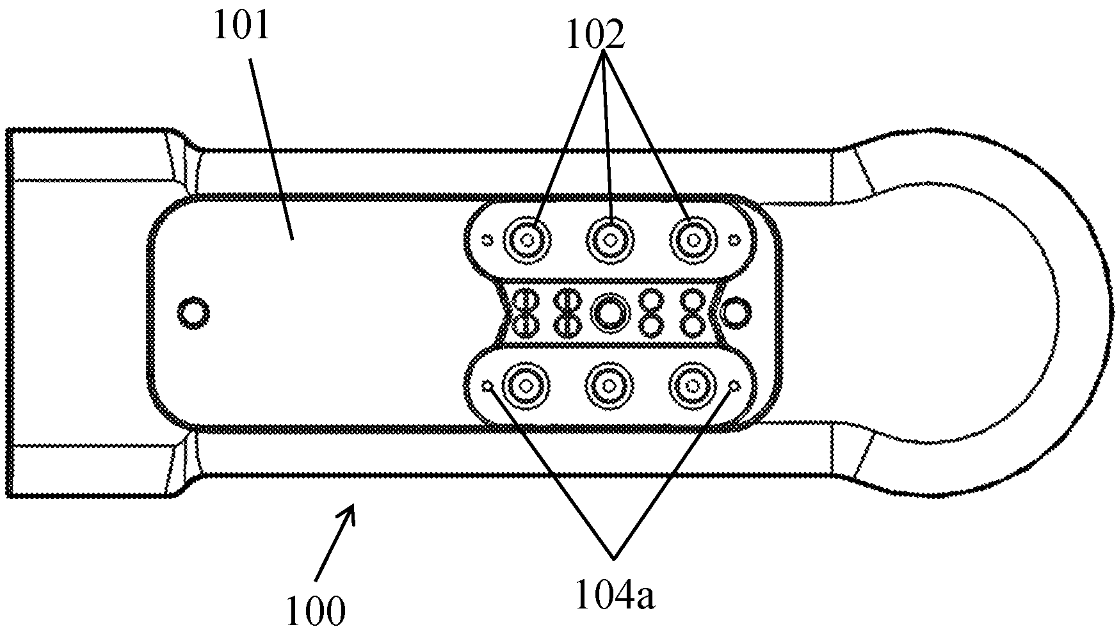
FIG. 3 is a top down image of a partially-assembled bar gun handle in accordance with a first embodiment of the present disclosure.

FIG. 3 shows a top view of a partially-assembled embodiment of bar gun handle 100. Each of the O-rings 102 is shown installed in an indentation or cavity on the top of body 101, the cavity having roughly the same size as the O-rings. As such, the top of the O-ring may be in close proximity or approximately level with the top surface of the bar gun handle's body 101. The installation of the O-rings 102 inside cavities on the top of body 101 is also shown in FIG. 2. Referring to FIG. 3 again, the four threaded holes 104*a* may be situated adjacent to the outermost O-ring indentations so as to receive the screws 104 for attaching the O-ring retaining plates 103, which are not shown in FIG. 3.

Figure 4:
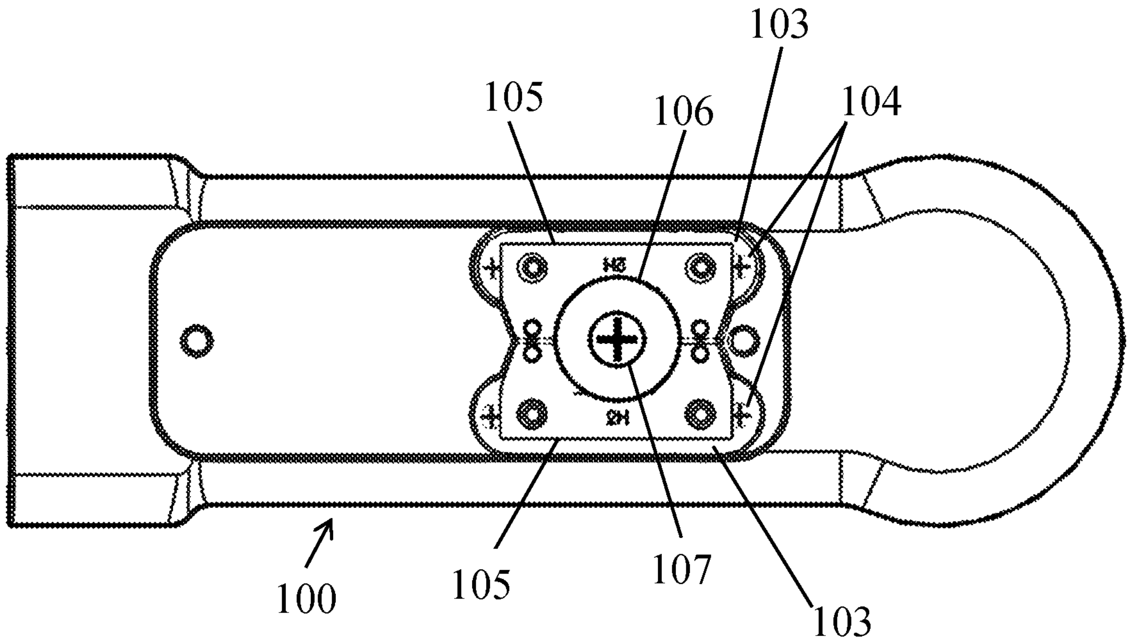
FIG. 4 is a top down image of a partially-assembled bar gun handle with a butterfly actuation plate in accordance with a first embodiment of the present disclosure.

FIG. 4 shows a top view of a partially-assembled embodiment of bar gun 100 with two butterfly plates 105, which are affixed by a washer 106 and screw 107, installed over the top of the O-ring retaining plates 103, which are affixed retain by screws 104. When a user depresses a button (not shown in FIG. 4), the button depresses one or both sides of the butterfly plate, which in turn actuates the valve stems shown in FIG. 1 and FIG. 2.

As an additional feature, it may be possible to permanently or semi-permanently affix or prevent tampering or removal of the retaining plates 103 by various means. For example, the screws 104 shown in FIG. 1 may be installed with thread locker, to inhibit their removal, or high adhesion stickers or caps may be affixed on top of them to inhibit access to the screws 104.

Other means of rigidly attaching, permanently or semi-permanently affixing, or preventing tampering or removal of the O-ring retaining plates 103 are possible. For example, instead of screws being used to hold down the retaining plates, a portion of the body of the bar gun handle may protrude up through the screw holes in the retaining plates 103. These protrusions may comprise posts of the material of construction of the body of the bar gun handle, such as food grade plastic. During manufacture, once the retaining plate is installed, the posts may permanently deformed, such as by high heat, thus making it difficult to remove the retaining plate. If a retaining plate is removed, it cannot be permanently reinstalled, and its prior removal will be evidence during subsequent inspection. In this embodiment, the retaining plates serve an anti-tamper feature in addition to retaining the O-rings in place during operation.

Figure 5:
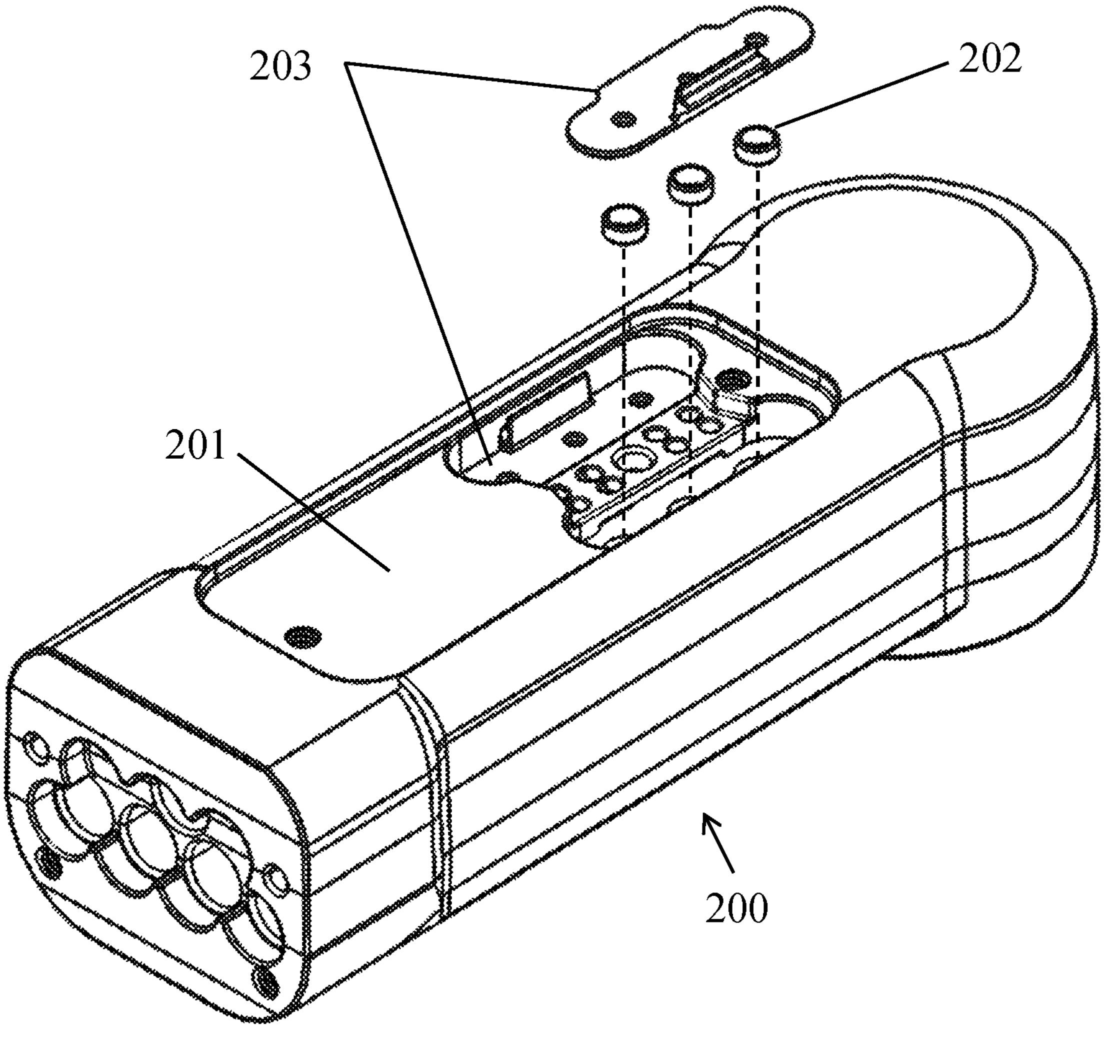
FIG. 5 is a partial exploded perspective view of a bar gun handle in accordance with a second embodiment of the present disclosure.
Figure 6:
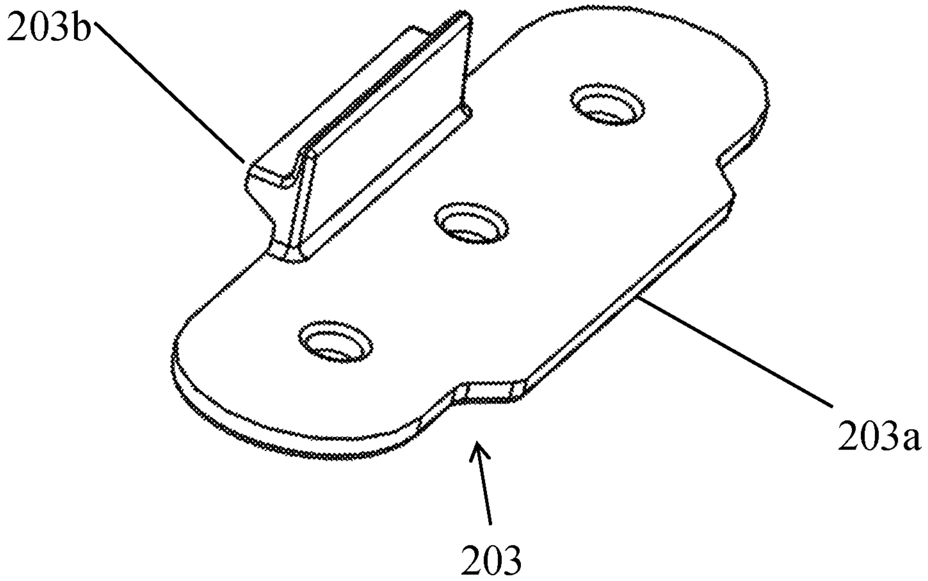
FIG. 6 is a perspective view of a retaining clip in accordance with a second embodiment of the present disclosure.
Figure 7:
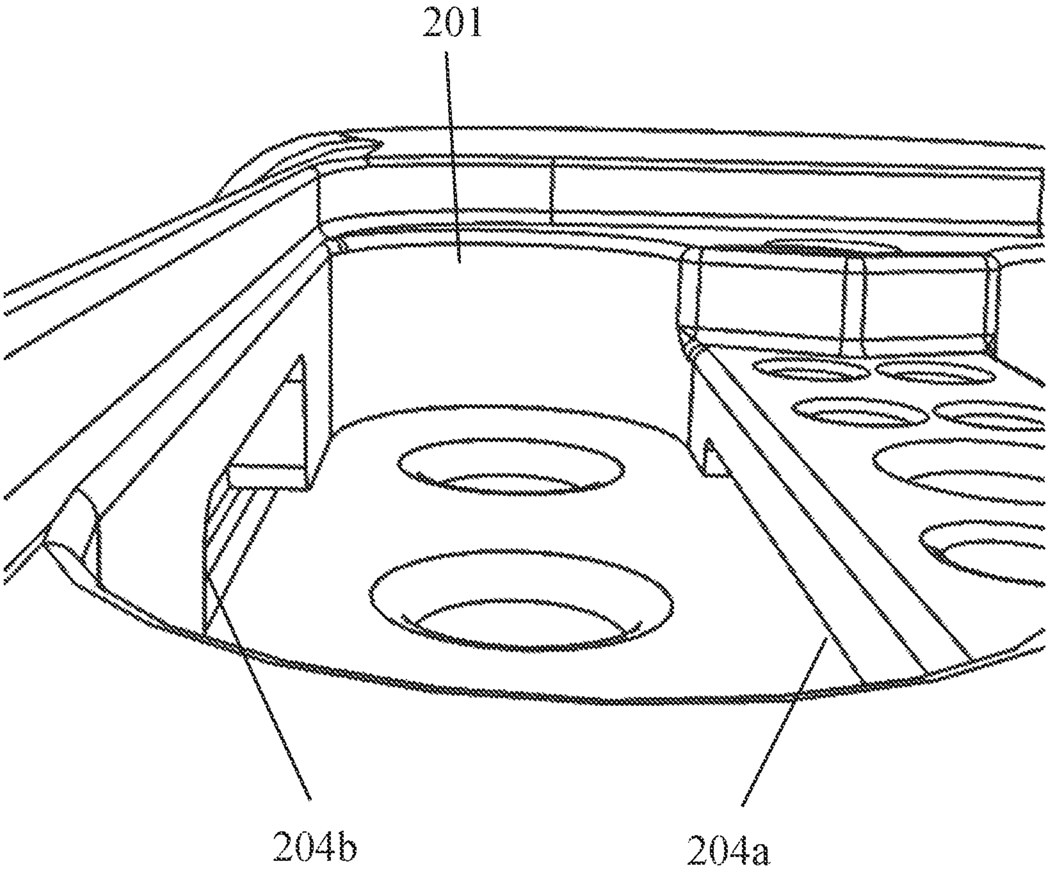
FIG. 7 is an enlarged top perspective view of a bar gun handle showing retaining clip slots in accordance with a second embodiment of the present disclosure.

A second embodiment of a system and method of using an O-ring retaining apparatus in a bar gun is shown in FIGS. 5-7. The apparatus comprises at least one retaining clip inserted into the body of the bar gun handle to hold the O-rings in place when the bar gun is in operation and contains fluids under pressure. The O-ring retaining clip may be made of a semi-flexible material. As used in this disclosure, "semi-flexible" refers to a material that is sufficiently flexible to be deformed by a stainless-steel tool, such as a flat-head screwdriver, but not manually by fingertips or fingernails. The O-ring retaining clip may be of different shapes and there may be a plurality of clips to retain the O-rings in place.

FIG. 5 shows a partial exploded perspective view of a bar gun handle 200, which is a six-valve bar gun configured for a five-button control panel (not shown). The handle 200 is configured to accept six toric joints or O-rings 202 with corresponding valve stems that proceed through holes in two retaining clips 203. The six O-rings 202 may have D-shaped cross sections or other cross-sectional shapes known in the art. The O-ring retaining clips 203 may be constructed of any suitable semi-flexible material, such as plastic, food-grade plastic, or other material. The retaining clips 203 may be inserted into one or more openings located in the body 201 of the bar gun handle 200 to restrain the O-rings 202.

FIG. 6 shows a perspective view of one embodiment of an O-ring retaining clip 203. As illustrated, the O-ring retaining clip 203 comprises an internal tab or flange 203*a* and an external tab or flange 203*b*.

FIG. 7 shows an enlarged top perspective view of bar gun handle 200 having slots or openings in the body 201 adapted to accept an O-ring retaining clip 203. As shown in FIG. 7, the body 201 may include an internal opening 204*a* and an external opening 204*b* to accommodate an O-ring retaining clip 203. The internal opening 204*a* is shaped to accept the corresponding internal tab 203*a* of an O-ring retaining clip 203, and the external opening 204*b* is shaped to accept the corresponding external tab 203*b* of O-ring retaining clip 203. Thus, the bar gun handle 200 includes two symmetric pairs of openings—an internal opening 204*a* and an external openings 204*b* for each of the two O-ring retaining clips 203. Once inserted into bar gun handle 200, the semi-flexible O-ring retaining clips 203 may be removed with a suitable stainless-steel tool or instrument.

A person of ordinary skill will recognize that the semi-flexible O-ring retaining clips 203 may additionally be permanently or semi-permanently affixed to the body 201 of bar gun handle 200. For example, after installation the O-ring retaining clips 203 may be affixed to the body 101 of the bar gun handle 100 by heat welding or by glue, epoxies, or other by chemical adhesives.

A person of ordinary skill will further recognize that the disclosed O-ring retaining plate 103 and O-ring retaining clip 203 are not restricted to bar gun handles with only six valves, but that many alternatives are possible, including the number of valves. Similarly, a person of ordinary skill will recognize that the disclosed O-ring retaining plates and O-ring retaining clips are not restricted to a bar gun handle with a control panel with only five buttons. Possible alternatives may include a control panel of any multiplicity of buttons.

A third embodiment of a system and method of using an O-ring retaining apparatus in a bar gun is shown in FIGS. 8-14. The apparatus comprises at least one removable O-ring retainer inserted into the body of the bar gun handle to hold the O-rings in place when the bar gun is in operation and contains fluids under pressure. The O-ring retainer of the third embodiment may be of different shapes from that illustrated, and there may be a plurality of such O-ring retainers to retain the O-rings in place.

Figure 8:
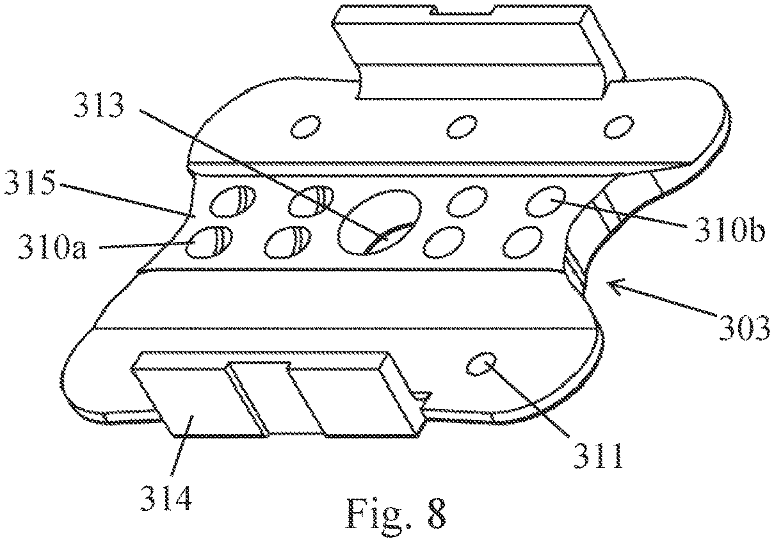
FIG. 8 is a perspective view of an O-ring retainer in accordance with a third embodiment of the present disclosure.

FIG. 8 shows a perspective view of a removable O-ring retainer 303. As illustrated, the O-ring retainer 303 includes a pair of opposing side walls or tabs 314, each having a central notch or slot to facilitate removal; a central raised portion or ridge 315; and a plurality of openings or apertures 311 passing through retainer 303, each opening 311 dimensioned to receive a valve stem in an assembled bar gun. In the exemplary retainer 303 shown in FIGS. 8, 9*a*, and 9*b*, six openings 311 are separated into two parallel groups of three openings 311. To secure retainer 303 into place in a bar gun handle, retainer 303 may be rigidly attached to the body of the bar gun handle by a fastener that passes though opening 313, including for example a screw or a bolt. The fastener that secures retainer 303 may also secure one or more butterfly actuation plates atop the retainer 303.

Figure 9A:
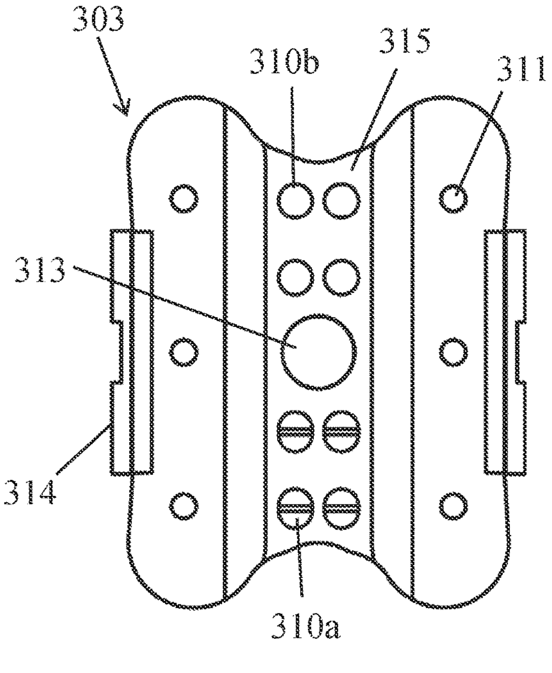
FIGS. 9*a* and 9*b* are top and bottom views, respectively, of an O-ring retainer in accordance with a third embodiment of the present disclosure.
Figure 9B:
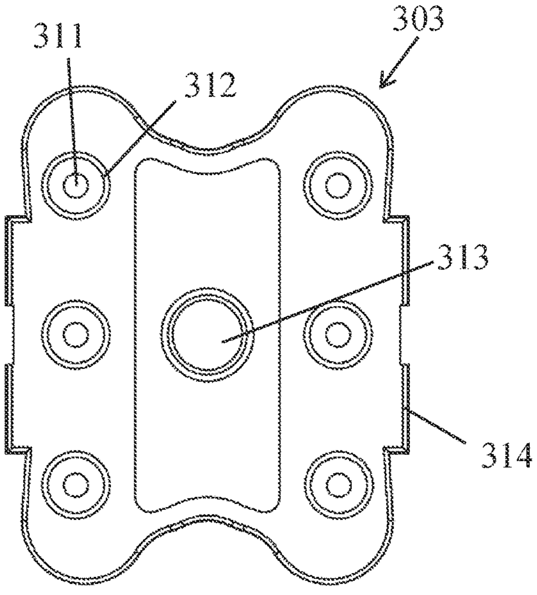
Figure 10:
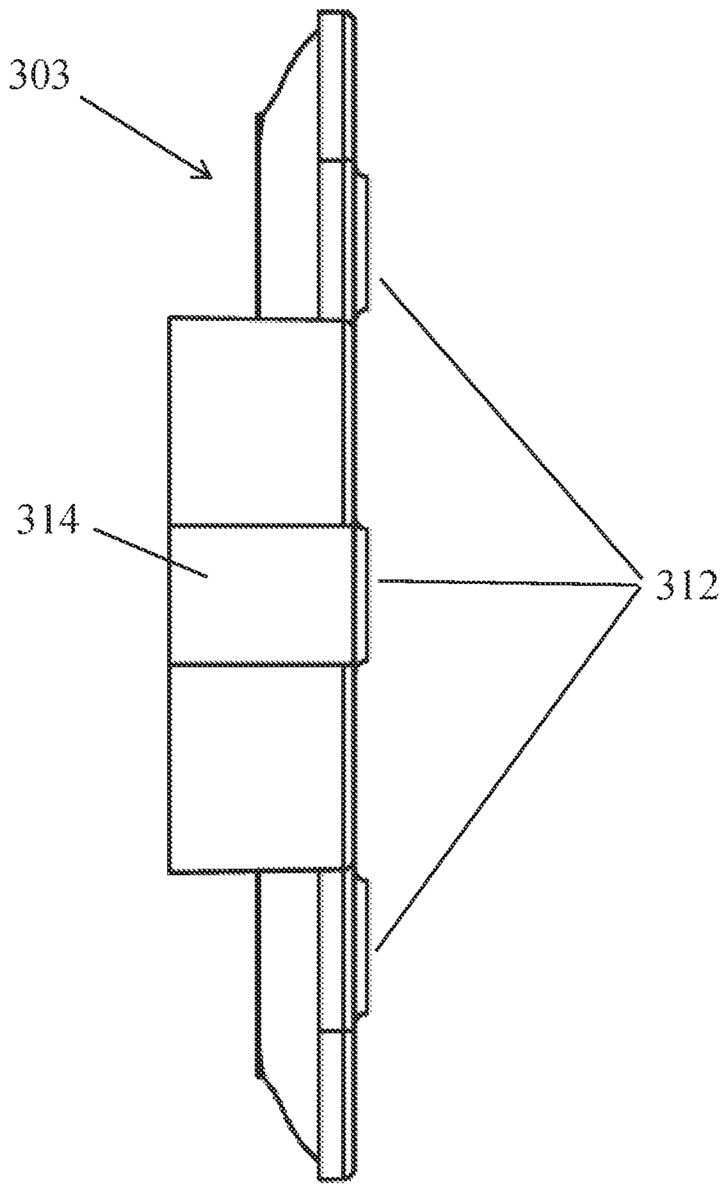
FIG. 10 is a side view of an O-ring retainer in accordance with a third embodiment of the present disclosure.

FIGS. 9*b* and 10 illustrate additional features of O-ring retainer 303, including a plurality of raised, circular protrusions 312 located on the bottom of the retainer 303. Each protrusion 312 fits into a corresponding O-ring cavity or gland in the body of a bar gun handle to compress and create a proper seal with a toric joint or O-ring, which is positioned within the gland and surrounds a valve stem in a fully assembled bar gun. Centered within each protrusion 312 is an opening 311, through which a valve stem will pass in a fully assembled bar gun. As illustrated, FIGS. 9*b* and 10 include six protrusions 312 for six corresponding O-ring cavities in a bar gun handle.

Referring to FIGS. 8 and 9*a*, the central ridge 315 provides features adapted to interface with one or more butterfly plates. To that end, the top of central ridge 315 may accommodate a plurality of indentations 310*a* and a plurality of indentations 310*b*. For example, as shown in FIGS. 8 and 9*a*, one section of the central ridge 315 may include a group of four indentations 310*a* and another section may include a group of four indentations 310*b*. These indentations may generally possess the shape of a spherical cap or spherical dome, including a hemisphere. The plurality of indentations 310*a* may differ from the plurality of indentations 310*b*; for example, each indentation 310*a* may include a semi-circular lip that running from near the surface of central ridge 315 to the bottom of the indentation 310*a*, as illustrated in FIGS. 8 and 9*a*. The plurality of indentations 310*a* and plurality of indentations 310*b* may receive a plurality of bearings or rotatable projections located on one or more butterfly plates. O-ring retainer 303 may use different numbers, groupings, types, and positions of indentations from that shown in the figures. Because the retainer 303 integrates central ridge 315 having features adapted to interface with one or more butterfly plates, the bar gun handle to which retainer 303 is secured may omit butterfly-plate interface features on the bar gun handle body other than an opening to receive the fastener passing through opening 313.

Figure 11:
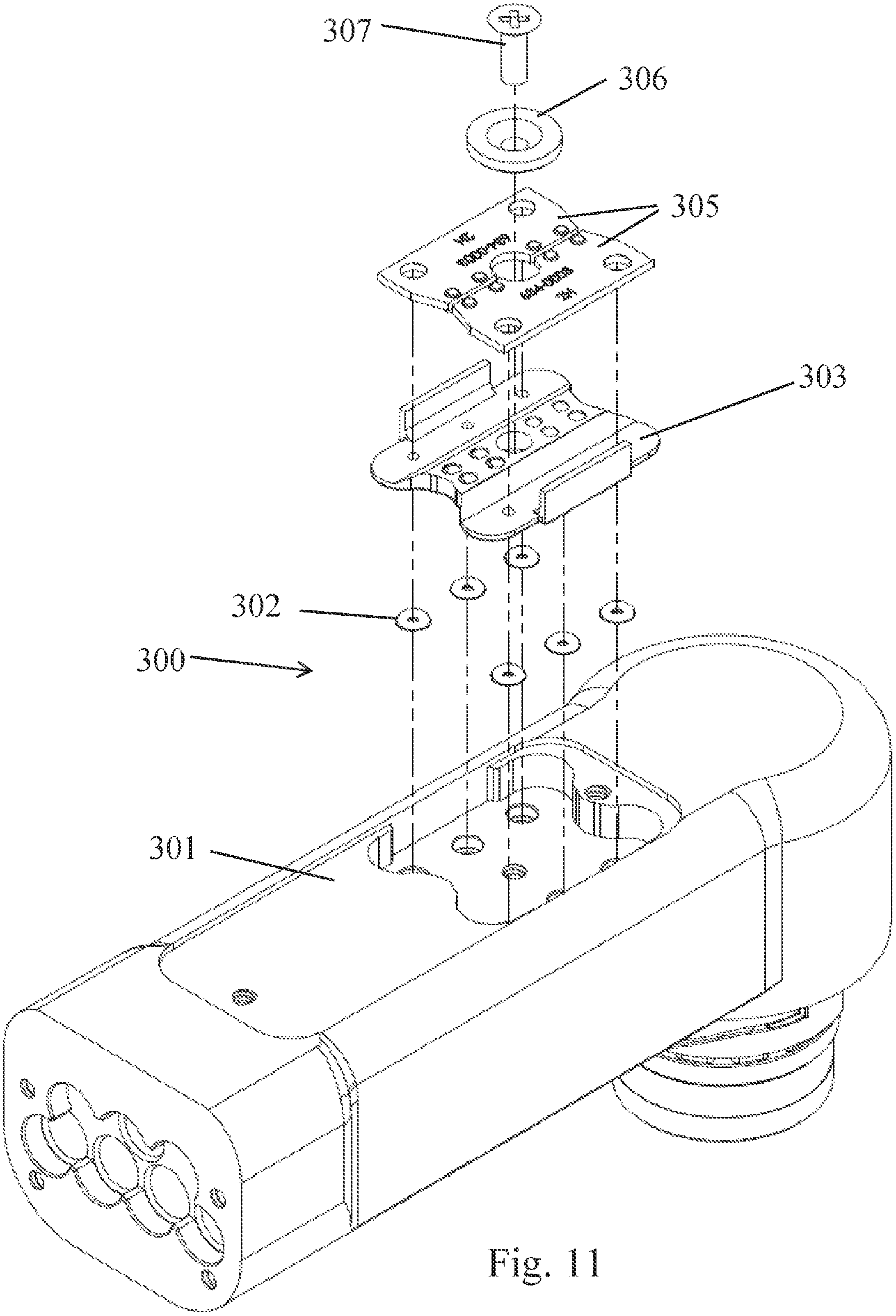
FIG. 11 shows a partial exploded perspective view of a bar gun handle in accordance with a third embodiment of the present disclosure.

FIG. 11 shows a partial exploded perspective view of a bar gun handle 300, which is a six-valve bar gun (control panel not shown). The handle 300 is configured to accept six O-rings 302 positioned around six corresponding valve stems in body 301 of handle 300. The O-ring retainer 303 may be installed above the O-rings 302 in a corresponding indentation in the top of body 301, with the valve stems proceeding through six holes in O-ring retainer 303. Two butterfly plates 305 may be positioned on top of and engage corresponding features, such as indentations, on O-ring retainer 303. The butterfly plates 305 and O-ring retainer 303 may be fastened to the body 301 of the bar gun handle 300 by screw 307 and plate 306. While FIG. 11 shows O-ring retainer 303 configured for installation in a corresponding indentation in the top of body 301, there may be no indentation in body 301 or the indentation may be of different dimensions than O-ring retainer 303.

Figure 12:
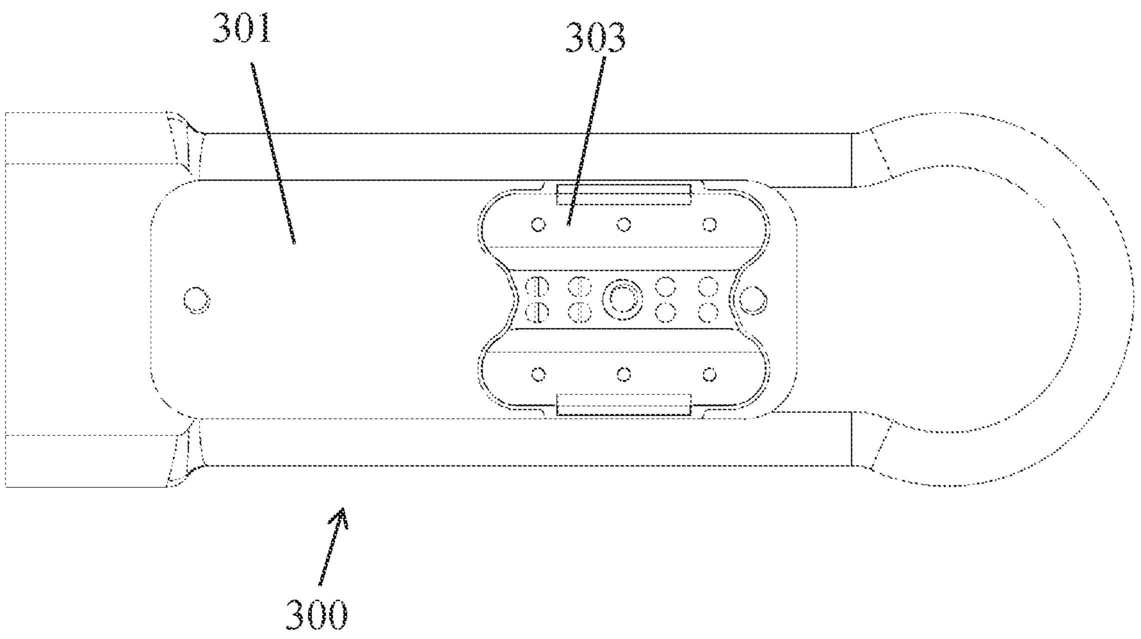
FIG. 12 is a top down image of a partially-assembled bar gun handle in accordance with a third embodiment of the present disclosure.

FIG. 12 shows a top view of a partially-assembled embodiment of bar gun handle 300, namely, the O-ring retainer 303 installed in a corresponding indentation on top of body 301 of handle 300.

Figure 13:
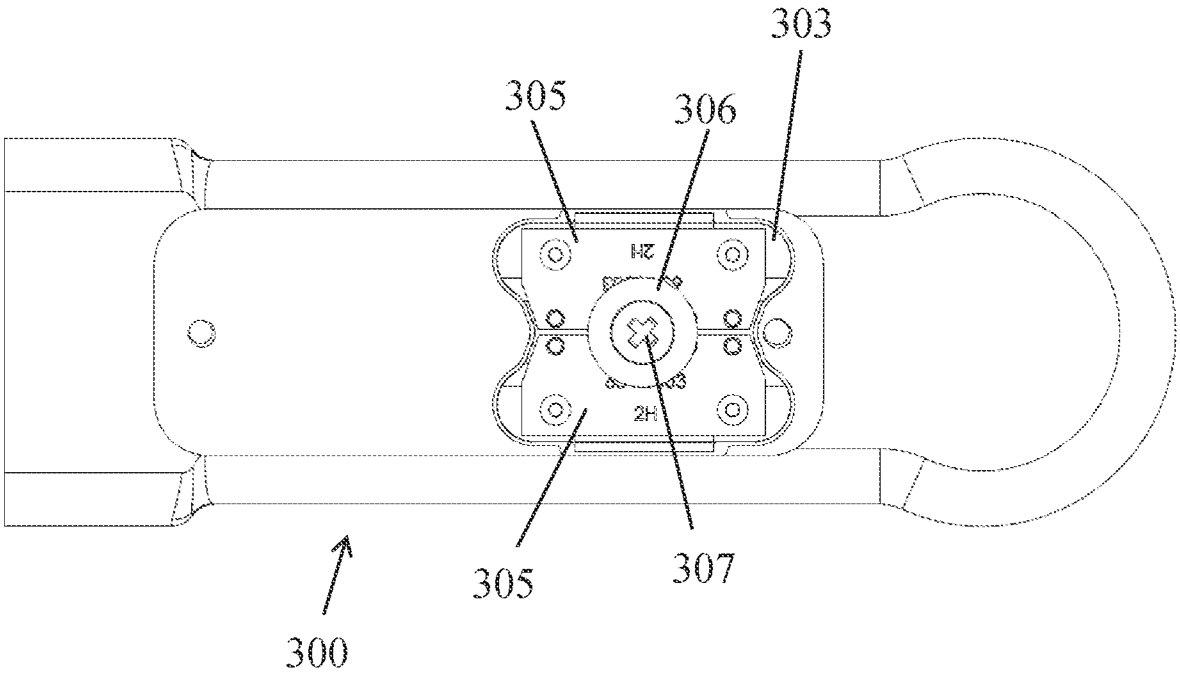
FIG. 13 is a top down image of a partially-assembled bar gun handle with butterfly actuation plates in accordance with a third embodiment of the present disclosure.

FIG. 13 shows a top view of a partially-assembled embodiment of bar gun 300, with two butterfly plates 305 installed over O-ring retainer 303, all secured in place by a plate 306 and screw 307. When a user depresses a button (not shown), the button may depress one or more valves stems passing through O-ring retainer 303 and/or one or more butterfly plates 305.

Figure 14:
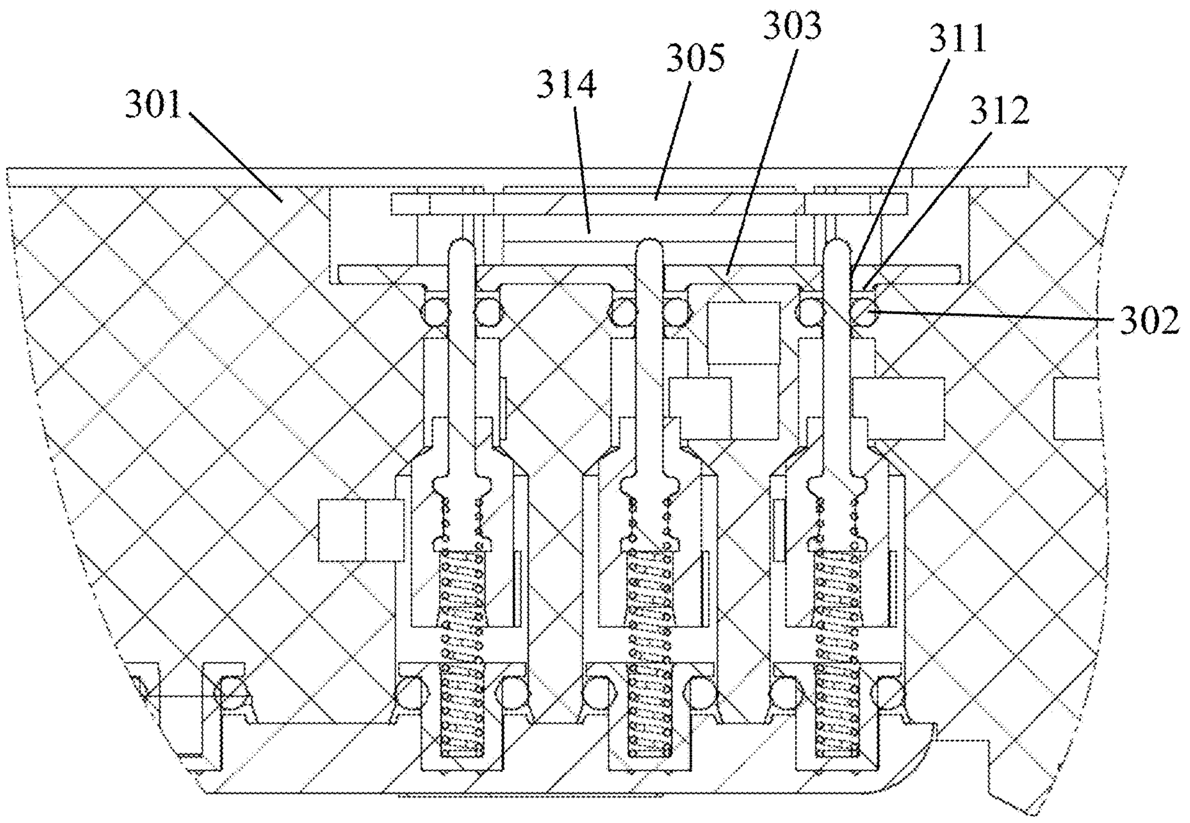
FIG. 14 is a partial cross-sectional view of a bar gun handle in accordance with a third embodiment of the present disclosure.

FIG. 14 is a partial cross-sectional view of the bar gun handle 300 of FIG. 13, showing the vertical plane passing through the valve stems (the control panel is not shown). As illustrated by FIG. 14, in this embodiment, the installed butterfly plate 305 is positioned over the installed O-ring retainer 303, which is positioned on the surface of body 301. Opposing tab 314 is positioned against a side of the corresponding indentation in the top of body 301. Each opening 311 in retainer 303 receives a valve stem passing therethrough. The circular protrusions 312 located on the bottom of the retainer 303 engage corresponding O-ring glands in body 301, each gland including an O-ring 302.

The removable O-ring retainer 303 may be constructed of any suitable material, such as metal, plastic, food-grade plastic, molded acrylic, or other material, including a semi-flexible material as described herein.

A person of ordinary skill will recognize that O-ring retainer 303 may be rendered non-removable by permanently or semi-permanently affixing it to a bar gun handle. For example, after installation the O-ring retainer 303 may be permanently or semi-permanently affixed to the body of a bar gun handle by heat welding or by glue, epoxies, or other by chemical adhesives.

A person of ordinary skill will further recognize that the disclosed O-ring retainer 303 is not limited to bar gun handles with only six valves, but that many alternatives are possible, including the number of valves. Similarly, a person of ordinary skill will recognize that the disclosed O-ring retainer 303 is not restricted to a bar gun handle with a control panel having a specific number of buttons.

While the subject of this specification has been described in connection with one or more exemplary embodiments, it is not intended to limit the claims to the particular forms set forth. On the contrary, the appended claims are intended to cover such alternatives, modifications and equivalents as may be included within their spirit and scope.

What is claimed is:

1. A monolithic clip for retaining a symmetrically arranged plurality of O-rings in a beverage dispensing device, the monolithic clip comprising:
- a clip body having a central axis, a top, a bottom, and a pair of opposing tabs positioned laterally relative to the central axis; and
- a plurality of circular protrusions extending from the bottom of the clip body and adapted to interface with the plurality of O-rings, the plurality of circular protrusions symmetrically arranged about the central axis.

2. The monolithic clip of claim 1 further comprising an elevated ridge positioned along the central axis on the top of the clip body; wherein the elevated ridge comprises a plurality of indentations adapted to receive a plurality of bearings.

3. The monolithic clip of claim 2, wherein the plurality of indentations are hemispherical in shape and symmetrically arranged about the central axis.

4. The monolithic clip of claim 3, wherein at least two of the plurality of indentations have a semi-circular lip therein.

5. The monolithic clip of claim 4 further comprising an opening in the clip body adapted to receive a fastener.

6. The monolithic clip of claim 5 wherein the opening in the clip body is positioned on the elevated ridge.

7. The monolithic clip of claim 6, wherein the fastener comprises a screw.

8. A beverage dispensing device comprising:

a handle having a longitudinal axis;

a first plurality of valves and a second plurality of valves in said handle, wherein said first plurality of valves and said second plurality of valves are symmetrically arranged about the longitudinal axis of said handle, and wherein each valve of said first plurality of valves and second plurality of valves has a reciprocating valve stem;

a first plurality of O-rings installed around the valve stems of the first plurality of valves;

a second plurality of O-rings installed around the valve stems of the second plurality of valves; and a monolithic clip having a central axis, a top, a bottom, a pair of opposing tabs positioned laterally relative to the central axis, and a plurality of circular protrusions extending from the bottom of the monolithic clip;

wherein the plurality of circular protrusions of the monolithic clip are symmetrically arranged about the central axis and sealingly engage the first plurality of O-rings and the second plurality of O-rings.

9. The beverage dispensing device of claim 8, wherein the monolithic clip further comprises an elevated ridge positioned on the top of the monolithic clip along the central axis; wherein the elevated ridge comprises a plurality of indentations adapted to receive a plurality of bearings.

10. The beverage dispensing device of claim 9 further comprising a first steel actuation plate having a plurality of bearings thereupon and a second steel actuation plate having a plurality of bearings thereupon.

11. The beverage dispensing device of claim 10, wherein the plurality of indentations on the elevated ridge engage the plurality of bearings of the first steel actual plate and the plurality of bearings of the second steel actual plate.

12. The beverage dispensing device of claim 11, wherein the plurality of indentations on the elevated ridge are hemispherical in shape and symmetrically arranged about the central axis.

13. The beverage dispensing device of claim 12, wherein at least two of the plurality of indentations have a semicircular lip therein.

* * * * *